United States Patent
Högnelid et al.

(10) Patent No.: US 10,734,820 B2
(45) Date of Patent: Aug. 4, 2020

(54) SYSTEM AND METHOD FOR PROVIDING ELECTRIC ENERGY TO ELECTRIC MOTOR VEHICLES

(71) Applicant: CaCharge AB, Stockholm (SE)

(72) Inventors: Kurt Högnelid, Bromma (SE); Tomas Öquist, Upplands Väsby (SE)

(73) Assignee: CaCharge AB, Stockholm (SE)

( * ) Notice: Subject to any disclaimer, the term of this patent is extended or adjusted under 35 U.S.C. 154(b) by 399 days.

(21) Appl. No.: 15/561,782

(22) PCT Filed: Mar. 24, 2016

(86) PCT No.: PCT/SE2016/050249
§ 371 (c)(1),
(2) Date: Sep. 26, 2017

(87) PCT Pub. No.: WO2016/159861
PCT Pub. Date: Oct. 6, 2016

(65) Prior Publication Data
US 2018/0083462 A1    Mar. 22, 2018

(30) Foreign Application Priority Data
Apr. 1, 2015 (SE) ........................ 1550393

(51) Int. Cl.
*H01M 10/44* (2006.01)
*H01M 10/46* (2006.01)
(Continued)

(52) U.S. Cl.
CPC ............ *H02J 7/0021* (2013.01); *B60L 50/50* (2019.02); *B60L 53/14* (2019.02); *B60L 53/305* (2019.02);
(Continued)

(58) Field of Classification Search
CPC ............ H02J 7/0021; H02J 7/0026; H02J 2007/0001; H02J 7/007; H02J 7/0077; H02J 7/02
(Continued)

(56) References Cited

U.S. PATENT DOCUMENTS

2010/0134067 A1* 6/2010 Baxter ................. B60L 3/0084
320/109
2012/0056582 A1* 3/2012 Iwata ....................... H02J 3/14
320/109
(Continued)

FOREIGN PATENT DOCUMENTS

EP   2645514 A1   10/2013
EP   2792538 A2   10/2014
(Continued)

OTHER PUBLICATIONS

International Search Report for PCT/SE2016/050249 dated Jun. 30, 2016.
(Continued)

*Primary Examiner* — Edward Tso
(74) *Attorney, Agent, or Firm* — Moore & Van Allen PLLC; W. Kevin Ransom

(57) ABSTRACT

Electric power is provided to motor vehicles via a respective outlet station. A number of outlet stations are connected to a common electric power supply, each with an interface towards a control node. Over the interfaces, the outlet stations receive operation commands from and send status messages to the control node. The control node allocates a fraction of the common electric power supply to each outlet station to which a motor vehicle is connected. The fractions are allocated such that a sum of all fractions represent a total delivered power, which is less than or equal to a predefined maximum level for the common electric power supply. If an interface between an outlet station and the control node is
(Continued)

broken, the outlet station is configured to apply a power supply scheme according to which the outlet station is only allowed to deliver electric power up to a level prescribed by a predefined principle stored in each of the outlet stations.

17 Claims, 3 Drawing Sheets

(51) Int. Cl.
| | |
|---|---|
| *H02J 7/00* | (2006.01) |
| *B60L 53/63* | (2019.01) |
| *B60L 53/30* | (2019.01) |
| *B60L 50/50* | (2019.01) |
| *B60L 53/14* | (2019.01) |
| *B60L 53/68* | (2019.01) |
| *G06F 13/10* | (2006.01) |
| *H04W 4/80* | (2018.01) |
| *H04W 4/30* | (2018.01) |
| *H04W 92/00* | (2009.01) |

(52) U.S. Cl.
CPC .............. *B60L 53/63* (2019.02); *B60L 53/68* (2019.02); *G06F 13/10* (2013.01); *H02J 7/007* (2013.01); *H02J 7/0063* (2013.01); *B60L 2250/20* (2013.01); *H04W 4/30* (2018.02); *H04W 4/80* (2018.02); *H04W 92/00* (2013.01); *Y02D 10/14* (2018.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01)

(58) Field of Classification Search
USPC .............. 320/104, 107, 109, 132, 133, 149; 307/11, 31; 703/18
See application file for complete search history.

(56) References Cited

U.S. PATENT DOCUMENTS

| | | | |
|---|---|---|---|
| 2012/0074901 | A1 | 3/2012 | Mohammed |
| 2013/0088199 | A1 | 4/2013 | Matsuno et al. |
| 2017/0279273 | A1* | 9/2017 | Tischer ................. H02J 3/14 |

FOREIGN PATENT DOCUMENTS

| | | |
|---|---|---|
| WO | 2010120551 A1 | 10/2010 |
| WO | 2012055756 A1 | 5/2012 |
| WO | 2012163396 A1 | 12/2012 |
| WO | 2013100764 A1 | 7/2013 |

OTHER PUBLICATIONS

Written Opinion of the International Searching Authority for PCT/SE2016/050249 dated Jun. 30, 2016.
Extended European Search Report for PCT/SE2016/059249 dated Oct. 25, 2018.
Cacharge AB, European Application No. 16773568.7, Communication pursuant to Article 94(3) EPC, dated Nov. 13, 2019.

* cited by examiner

SYSTEM AND METHOD FOR PROVIDING ELECTRIC ENERGY TO ELECTRIC MOTOR VEHICLES

CROSS-REFERENCE TO RELATED APPLICATION(S)

This application is a national stage application (filed under 35 § U.S.C. 371) of PCT/SE16/050249, filed Mar. 24, 2016 of the same title, which, in turn claims priority to Swedish Application No. 1550393-1, filed Apr. 1, 2015 of the same title; the contents of each of which are hereby incorporated by reference.

FIELD OF THE INVENTION

The present invention relates generally to solutions for distributing electricity to vehicle-mounted consumers, e.g. electric car-owners and drivers of so-called hybrid vehicles.

BACKGROUND OF THE INVENTION

In the light of today's air pollution and increasing environmental problems relating to fossil fuels the demand for electric-powered vehicles increases steadily. For most consumers, electric power is exclusively available at one single place, namely at the respective consumer's home, or the address associated with his/her electricity contract. Of course, this is a severe limitation for electric-vehicle drivers who may want to travel a relatively long distance from a point A (say at his/her home) to a point B, where re-fuelling (or rather re-charging of batteries) may be required before continuing.

Therefore various examples of public charging stations have been developed which allow users to refuel their electric-powered vehicles, for example while being parked in a parking lot. To provide a low threshold for establishing such systems simplicity and low costs are important factors. However, combining these factors with robustness and reliability is challenging from a technical point-of-view.

SUMMARY OF THE INVENTION

The object of the present invention is to solve the above problem, and offer a reliable and cost-efficient delivery of electric power to motorvehicle users, for example to charge a vehicle's batteries when the vehicle is stationary for a relatively long cohesive period, such as while its user is at work, and his/her vehicle is parked in the employers parking lot.

According to one aspect of the invention, the object is achieved by the initially described system, wherein if an interface between an outlet station and the control node is broken, the outlet station is configured to apply a predefined principle stored in each of the outlet stations.

For example, the predefined principle may here prescribe that, if an interface between an outlet station and the control node is broken, the outlet station is only allowed to deliver electric power up to a certain level during particular intervals given by a predefined time sequence (e.g. if there are eight outlet stations, two of them may each deliver up to half of a predefined maximum level during one quarter of the time according to a repeating sequence).

Alternatively, the predefined principle may prescribe that, if an interface between an outlet station and the control node is broken, the outlet station is only allowed to deliver electric power up to a level equal to the predefined maximum level divided by the number of outlet stations connected to the common electric power supply. In other words, if ten outlet stations are connected to the common electric power supply, an outlet station being temporary disconnected from the control node may only deliver up to $1/10^{th}$ of the predefined maximum level for the common electric power supply.

This system is advantageous because it is very straightforward to define and implement the predefined principle, which guarantees that the predefined maximum level for the common electric power supply is never exceeded. At the same time, an outlet station that loses contact with the control node may continue to provide electric power any connected customer equipment.

According to one preferred embodiment of this aspect of the invention, the interface towards the control node is implemented via a short-range radio link, such as Bluetooth, BLE (Bluetooth Low Energy) or WiFi (i.e. a wireless standard in the IEEE 802.11 family). This type of interface is beneficial because it enables a simple setup of the system in most environments. Alternatively, a conventional wired communication interface towards the control node is likewise conceivable.

According to another preferred embodiment of this aspect of the invention, the interface towards the control node is implemented via a power-line communication link established over at least one electric conductor between the outlet station and the common electric power supply. This type of interface is beneficial because it provides reliable communication between the control node and the outlet stations, especially if the control node is co-located with the common electric power supply.

According to yet another preferred embodiment of this aspect of the invention, the control node also includes a wireless communication interface configured to receive a power-output request from a mobile terminal. The power-output request uniquely identifies a user and one of the outlet stations. The control node is further configured to check whether or not the identified user is authorized. In response to that the user is found to be authorized, the control node is configured enable a power-transfer session via the identified outlet station. Thereby, users may gain access to electric power from the system in a very conveniently manner.

According to another aspect of the invention, the object is achieved by the method described initially, wherein, if an interface between an outlet station and the control node is broken, the outlet station is configured to apply a power supply scheme according to which the outlet station is only allowed to deliver electric power up to a level specified by a predefined principle stored in each of the outlet stations. The advantages of this method, as well as the preferred embodiments thereof, are apparent from the discussion above with reference to the proposed system.

According to a further aspect of the invention the object is achieved by a computer program product, which is loadable into the memory of a computer, and includes software for performing the steps of the above proposed method when executed on a computer.

According to another aspect of the invention the object is achieved by a computer readable medium, having a program recorded thereon, where the program is make a computer perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION OF THE INVENTION

Figure 1:
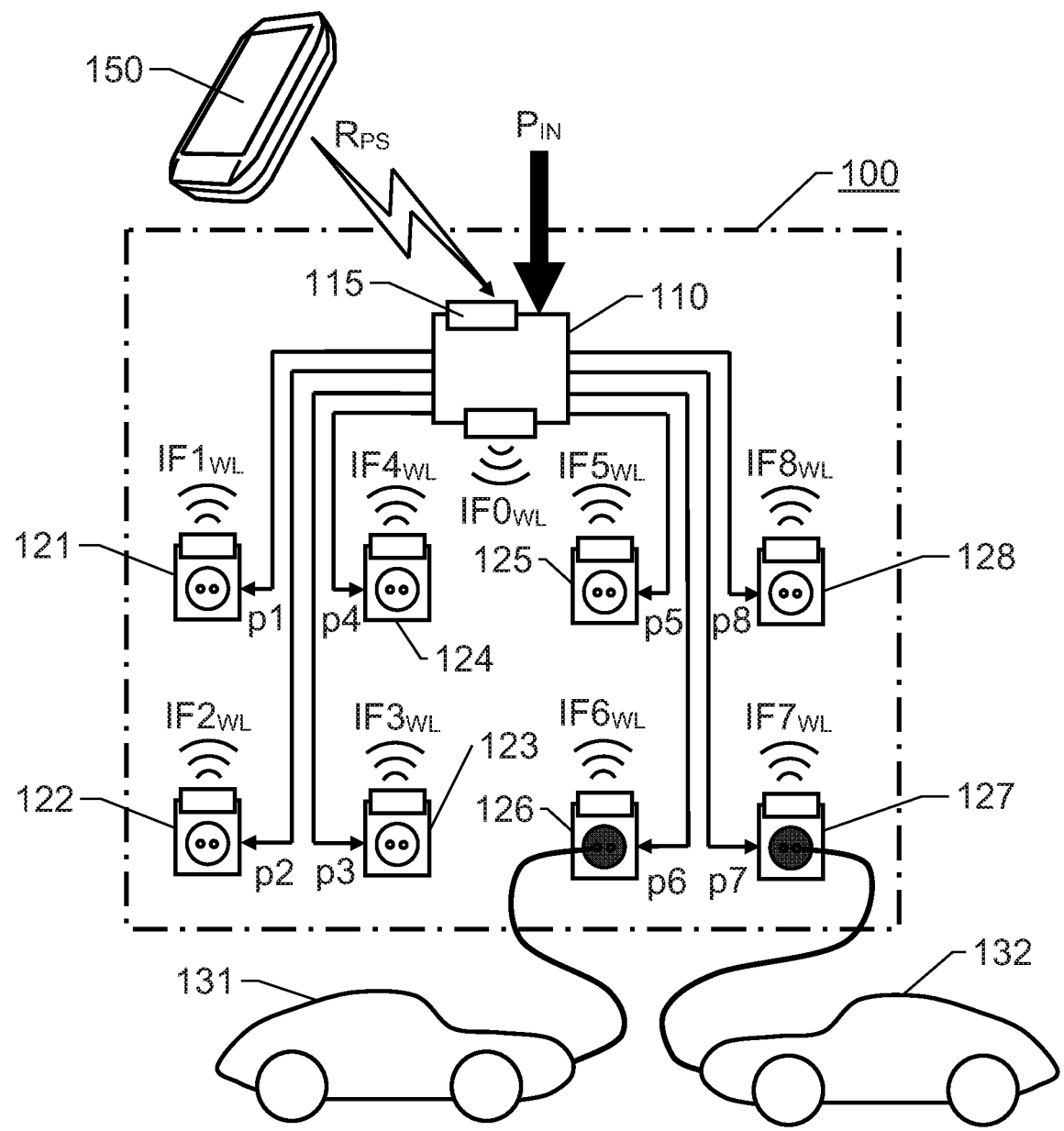
FIG. 1 shows a block diagram over a system according to a first embodiment of the invention.

Initially, we refer to FIG. 1, showing a block diagram over a system 100 according to a first embodiment of the invention for providing electric power to motor vehicles.

Here, the motor vehicles are represented by two passenger cars 131 and 132 respectively, for example a purely battery-powered electric car, a hybrid car, or any other type vehicle that requires electric energy (e.g. a combustion-engine car whose battery is low, or has an engine block heater).

The system includes a control node 110 and a number of outlet stations, here represented by 121, 122, 123, 124, 125, 126, 127 and 128 respectively that are connected to a common electric power supply $P_{IN}$. In the embodiment shown in FIG. 1, the control node 110 is co-located with the common electric power supply $P_{IN}$, which is generally preferable from a practical point of view. However, according to the invention, any other location of the control node 110 is equally well conceivable.

Each of the outlet stations 121, 122, 123, 124, 125, 126, 127 and 128 is configured to feed electric power to a specific motor vehicle during a power-transfer session. Thus, the outlet stations are equipped with a respective electric outlet.

Additionally, each of the outlet stations 121, 122, 123, 124, 125, 126, 127 and 128 has an interface $IF1_{WL}$, $IF2_{WL}$, $IF3_{WL}$, $IF4_{WL}$, $IF5_{WL}$, $IF6_{WL}$, $IF7_{WL}$ and $IF8_{WL}$ respectively towards the control node 110. These interfaces are configured to receive operation commands from the control node 110 and to send status messages to the control node 110.

In normal operation, the control node 110 is configured to allocate a fraction p6 and p7 of the common electric power supply $P_{IN}$ to each outlet station, here 126 and 127, to which a motor vehicle is connected, i.e. 131 and 132 respectively. Specifically, the control node 110 is configured to allocate the fractions such that a sum of all fractions represent a total delivered power which is less than or equal to a predefined maximum level for the common electric power supply $P_{IN}$. Thereby, namely, the capacity of the system 100 is not overridden.

Nevertheless, should the control node 110 lose its ability to control one or more outlet stations because the interface over which the operation commands are sent is broken, there is a potential risk that system capacity is overridden. Therefore, according to the invention, if an interface between an outlet station 121, 122, 123, 124, 125, 126, 127 and/or 128 and the control node 110 is broken, the outlet station in question is configured to apply a predefined principle stored in each outlet station.

The predefined principle may involve applying a power supply scheme, which prescribes that the outlet station is only allowed to deliver electric power up to a maximum power level which is equal to the predefined maximum level divided by the number of outlet stations. Consequently, given that the maximum power level is 1 600 W, and there are eight outlet stations 121, 122, 123, 124, 125, 126, 127 and 128 connected to the common electric power supply $P_{IN}$, as shown in FIG. 1, any outlet station, say 126, with a non-operating interface $IF6_{WL}$, may at most deliver electric power up to 200 W (i.e. 1 600/8 W) as long as the interface $IF6_{WL}$ remains broken.

Alternatively, a time-sharing procedure may be applied among the outlet stations whose interface towards the control node 110 is broken. For example, assume that there is eight outlet stations 121, 122, 123, 124, 125, 126, 127 and 128. Then, in case of a broken interface towards the control node 110, two stations at the time may be allowed to deliver electric power up to 800 W (i.e. 1 600/2 W) according to a predefined time sequence.

Naturally, any outlet stations, say 127, whose interface $IF7_{WL}$ operates correctly, may continue to deliver electric power in response to the operation commands from the control node 110 also if one or more outlet stations operate as prescribed by the proposed power supply scheme.

In the embodiment of the invention represented in FIG. 1, the interfaces $IF1_{WL}$, $IF2_{WL}$, $IF3_{WL}$, $IF4_{WL}$, $IF5_{WL}$, $IF6_{WL}$, $IF7_{WL}$, and $IF8_{WL}$ in the outlet stations 121, 122, 123, 124, 125, 126, 127 and 128 are implemented via a short-range radio link (e.g. of Bluetooth, BLE or WiFi type). Therefore, the control node 110 also has a corresponding wireless interface $IF0_{WL}$ for communicating the operation commands and the status messages.

Preferably, to enable convenient user access to the system 100, the control node 110 further contains a wireless communication interface 115 for receiving a power-output request $R_{PS}$ from a mobile terminal 150. Of course, this interface may be identical to the wireless interface $IF0_{WL}$ used for communicating with the outlet stations 121, 122, 123, 124, 125, 126, 127 and 128.

The power-output request $R_{PS}$ uniquely identifies a user and a particular outlet station, say 127. In response to a received power-output request $R_{PS}$, the control node 110 is configured to check whether or not the user identified in the power-output request $R_{PS}$ is authorized. If the user is found to be authorized, the control node 110 is further configured to enable a power-transfer session via the identified outlet station 127, i.e. here to provide electric power to the vehicle 132.

Figure 2:
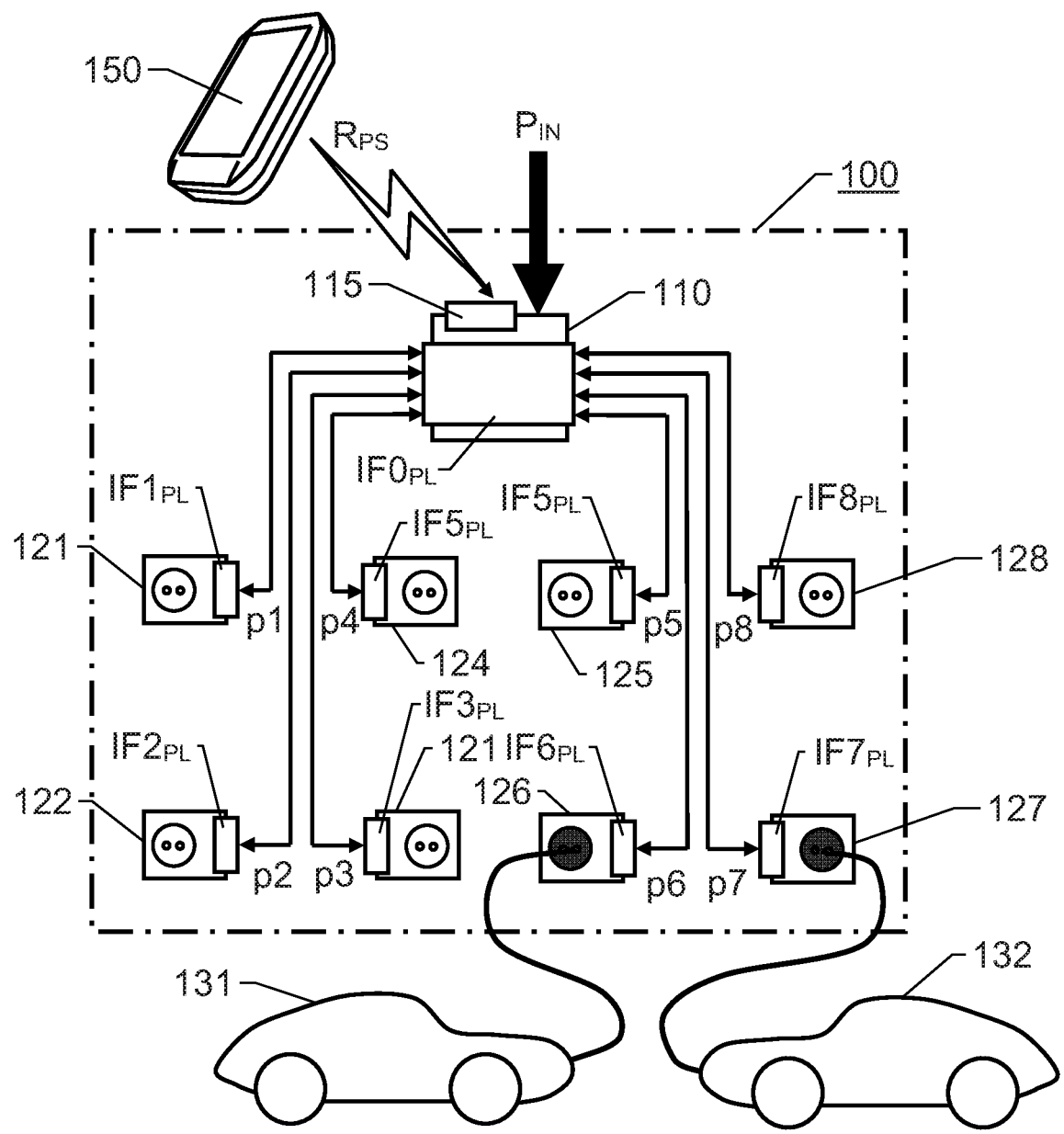
FIG. 2 shows a block diagram over a system according to a second embodiment of the invention.

FIG. 2 shows a block diagram over a system 100 according to a second embodiment of the invention. In FIG. 2, all reference signs which also occur in FIG. 1 designate the same units, signals and commands as described above with reference to FIG. 1.

Hence, the difference between the embodiment of the invention represented in FIG. 2 differs from that of FIG. 1 with respect to the technology used for implementing the interfaces the $IF1_{PL}$, $IF2_{PL}$, $IF3_{PL}$, $IF4_{PL}$, $IF5_{PL}$, $IF6_{PL}$, $IF7_{PL}$ $IF8_{PL}$ and $IF0_{PL}$ respectively between the outlet stations 121, 122, 123, 124, 125, 126, 127, and 128 and the control node 110. In FIG. 2, these interfaces are implemented via power-line communication links established over at least one electric conductor between the respective outlet stations 121, 122, 123, 124, 125, 126, 127 and 128 and the common electric power supply $P_{IN}$, here co-located with the control node 110.

Irrespective of the technology used for implementing said interfaces, the control node 110 preferably contains, or is in communicative connection with a memory unit storing a computer program product, which contains software for making the control node 110 execute the above-described actions when the computer program product is run on the control node 110.

Figure 3:
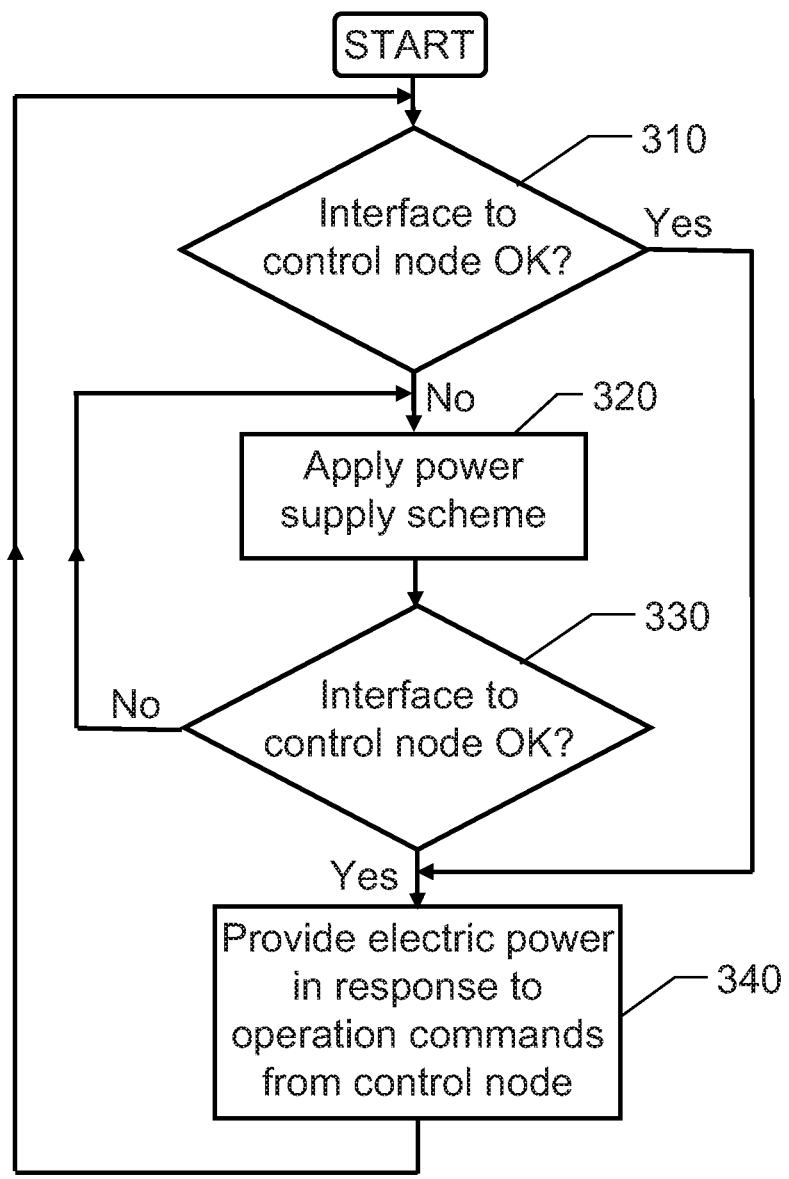
FIG. 3 illustrates, by means of a flow diagram, the general method according to the invention for providing electric power to motor vehicles.

In order to sum up, and with reference to the flow diagram in FIG. 3, we will now describe the general method executed in the outlet stations according to the invention.

In a first step 310, it is checked if the communications interface between the outlet station and the control node is operating; and if so, the procedure continues to a step 340. If, however, in step 310, it is found that the communications interface is broken, a step 320 follows, in which the outlet station is applies a power supply scheme according to which the outlet station is only allowed to deliver electric power up to a level specified by a predefined principle stored in each of the outlet stations.

Then, in a step 330, it is checked if the communications interface between the outlet station and the control node is operating; and if so, step 340 follows.

In step 340, the outlet station provides electric power to any connected consumer device in accordance with operation commands received from the control node over the communications interface. Subsequently, the procedure loops back to step 310.

All of the process steps, as well as any sub-sequence of steps, described with reference to FIG. 3 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for providing electric power to motor vehicles, the system comprising:
   a control node; and
   a number of outlet stations connected to a common electric power supply, each of said outlet stations being configured to feed electric power to a specific motor vehicle during a power-transfer session, each of said outlet stations comprising one or more interfaces towards the control node, the interfaces being configured to receive operation commands from the control node and send status messages to the control node,
   wherein the control node being configured to allocate a fraction of the common electric power supply to each outlet station to which a motor vehicle is connected, said fractions being allocated such that a sum of all fractions representing a total delivered power being less than or equal to a predefined maximum level for the common electric power supply,
   wherein if an interface between an outlet station and the control node is broken, the outlet station is configured to apply a power supply scheme according to which the outlet station is only allowed to deliver electric power up to a level specified by a predefined principle stored in each of the outlet stations,
   wherein the control node is co-located with the common electric power supply,
   wherein the control node is configured to allocate a fraction of the common electric power supply to each outlet station to which a motor vehicle is connected, said fractions being allocated such that a sum of all fractions representing a total delivered power being less than or equal to a predefined maximum level for the common electric power supply,
   wherein a time-sharing procedure is applied among the outlet stations having an interface towards the control node that is broken, which time-sharing procedure comprises:
      dividing said outlet stations with broken interface towards the control node into a number of subgroups, each of which contains an equal number of outlet stations; and at each point in time; and
      allowing electric power up to the predefined maximum level
   divided by the equal number of outlet stations to be delivered to each outlet station of said equal number of outlet stations in one of said subgroups according to a repeating sequence.

2. The system according to claim 1, wherein the predefined principle prescribes that, if an interface between an outlet station and the control node is broken, the outlet station is only allowed to deliver electric power up to a particular level during predefined intervals given by a predefined time sequence.

3. The system according to claim 1, wherein the predefined principle prescribes that, if an interface between an outlet station and the control node is broken, the outlet station is only allowed to deliver electric power up to a level equal to the predefined maximum level divided by a number of the outlet stations connected to the common electric power supply.

4. The system according to claim 1, wherein the interface towards the control node is implemented via a short-range radio link.

5. The system according to claim 1, wherein the interface towards the control node is implemented via a power-line communication link established over at least one electric conductor between the outlet station and the common electric power supply.

6. The system according to claim 1, wherein the control node comprises a wireless communication interface configured to receive a power-output request from a mobile terminal, the power-output request uniquely identifying a user and an outlet station of said outlet stations, and the control node is further configured to:
  check whether or not the user identified in a received power-output request is authorized, and if the user is authorized; and
  enable a power-transfer session via the identified outlet station.

7. The system according to claim 1, wherein the number of outlet stations whose interface towards the control node is broken equals eight, and wherein the time-sharing procedure comprises:
  dividing said outlet stations with broken interface towards the control node into four subgroups, each of which contains two outlet stations;
  and at each point in time, allowing electric power up to the predefined maximum level divided by two to be delivered to each outlet station of said two outlet stations in one of said four subgroups according to a repeating sequence.

8. A method for providing electric power to motor vehicles via a number of outlet stations connected to a common electric power supply, each of said outlet stations being configured to feed electric power to a specific motor vehicle during a power-transfer session, a control node being arranged to communicate with each of said outlet stations via a respective interface, the method comprising:
  receiving operation commands from the control node in the outlet stations;
  sending status messages from the outlet stations to the control node;
  allocating in the control node a fraction of the common electric power supply to each outlet station to which a motor vehicle is connected, said fractions being allocated such that a sum of all fractions representing a total delivered power being less than or equal to a predefined maximum level for the common electric power supply; and
  if an interface between an outlet station and the control node is broken, applying a power supply scheme in the outlet station according to which power supply scheme the outlet station is only allowed to deliver electric power up to a level specified by a predefined principle stored in each of the outlet stations,
  wherein the control node being co-located with the common electric power supply,
  wherein said allocating comprises allocating in the control node a fraction of the common electric power supply to each outlet station to which a motor vehicle is connected, said fractions being allocated such that a sum of all fractions representing a total delivered power being less than or equal to a predefined maximum level for the common electric power supply, and
  wherein said applying a power supply scheme comprises applying a time-sharing procedure among the outlet stations whose interface towards the control node is broken, which time-sharing procedure comprises:
    dividing said outlet stations with broken interface towards the control node into a number of subgroups, each of which contains an equal number of outlet stations; and at each point in time; and
    allowing electric power up to the predefined maximum level divided by the equal number of outlet stations to be delivered to each outlet station of said equal number of outlet stations in one of said subgroups according to a repeating sequence.

9. The method according to claim 8, wherein the predefined principle prescribes that, if an interface between an outlet station and the control node is broken, the outlet station is only allowed to deliver electric power up to a particular level during predefined intervals given by a predefined time sequence.

10. The method according to claim 8, wherein the predefined principle prescribes that, if an interface between an outlet station and the control node is broken, the outlet station is only allowed to deliver electric power up to a level equal to the predefined maximum level divided by the number of outlet stations connected to the common electric power supply.

11. The method according to claim 8, comprising:
  receiving the operation commands in and sending status messages from the outlet stations via a power-line communication link established over at least one electric conductor between the outlet station and the common electric power supply.

12. The method according to claim 8, further comprising:
  receiving, in the control node, a power-output request from a mobile terminal, the power-output request uniquely identifying a user and an outlet station of said outlet stations;
  checking, in the control node, whether or not the identified user is authorized; and
  if the user is found to be authorized, enabling, via at least one operation command from the control node, a power-transfer session via the identified outlet station.

13. A computer program product comprising a computer program code stored on a non-transitory computer-readable readable by a computer, said computer program product for providing electric power to motor vehicles via a number of outlet stations connected to a common electric power supply, each of said outlet stations being configured to feed electric power to a specific motor vehicle during a power-transfer session, a control node being arranged to communicate with each of said outlet stations via a respective interface, said computer program code comprising computer instructions to cause one or more computer processors to perform the following operations:
  receiving operation commands from the control node in the outlet stations;
  sending status messages from the outlet stations to the control node;
  allocating in the control node a fraction of the common electric power supply to each outlet station to which a motor vehicle is connected, said fractions being allocated such that a sum of all fractions representing a total delivered power being less than or equal to a predefined maximum level for the common electric power supply; and
  if an interface between an outlet station and the control node is broken, applying a power supply scheme in the outlet station according to which power supply scheme the outlet station is only allowed to deliver electric power up to a level specified by a predefined principle stored in each of the outlet stations,
  wherein the control node being co-located with the common electric power supply,
  wherein said allocating comprises allocating in the control node a fraction of the common electric power supply to each outlet station to which a motor vehicle is connected, said fractions being allocated such that a sum of all fractions representing a total delivered power being less than or equal to a predefined maximum level for the common electric power supply, and wherein said applying a power supply scheme comprises applying a time-sharing procedure among the outlet stations whose interface towards the control node is broken, which time-sharing procedure comprises:

dividing said outlet stations with broken interface towards the control node into a number of subgroups, each of which contains an equal number of outlet stations; and at each point in time; and allowing electric power up to the predefined maximum level divided by the equal number of outlet stations to be delivered to each outlet station of said equal number of outlet stations in one of said subgroups according to a repeating sequence.

14. The computer program product according to claim 13, wherein the predefined principle prescribes that, if an interface between an outlet station and the control node is broken, the outlet station is only allowed to deliver electric power up to a particular level during predefined intervals given by a predefined time sequence.

15. The computer program product according to claim 13, wherein the predefined principle prescribes that, if an interface between an outlet station and the control node is broken, the outlet station is only allowed to deliver electric power up to a level equal to the predefined maximum level divided by the number of outlet stations connected to the common electric power supply.

16. The computer program product according to claim 13, wherein said computer program code further comprises computer instructions to cause one or more computer processors to:

receive the operation commands in and sending status messages from the outlet stations via a power-line communication link established over at least one electric conductor between the outlet station and the common electric power supply.

17. The computer program product according to claim 13, wherein said computer program code further comprising computer instructions to cause one or more computer processors to:

receive, in the control node, a power-output request from a mobile terminal, the power-output request uniquely identifying a user and an outlet station of said outlet stations;

check, in the control node, whether or not the identified user is authorized; and if the user is found to be authorized, enable, via at least one operation command from the control node, a power-transfer session via the identified outlet station.

* * * * *